United States Patent [19]

Schallehn

[11] 3,722,357
[45] Mar. 27, 1973

[54] ARMORED VEHICLE

[75] Inventor: Hans-Georg Schallehn, Kassel, Germany

[73] Assignee: Rheinstahl Aktiengesellschaft, Essen, Germany

[22] Filed: Sept. 20, 1967

[21] Appl. No.: 670,021

[52] U.S. Cl. .................................................. 89/36 H
[51] Int. Cl. ............................................. F41h 7/02
[58] Field of Search ....... 89/36, 36 T, 36.4, 40, 40.11

[56] References Cited

UNITED STATES PATENTS

| 1,333,446 | 3/1920 | Ross | 89/40 |
| 1,660,269 | 2/1928 | Knox et al. | 98/1 |
| 2,382,862 | 8/1945 | Davis | 89/36 |
| 3,351,374 | 11/1967 | Forsyth et al. | 296/31 |

FOREIGN PATENTS OR APPLICATIONS

| 1,150,139 | 1/1958 | France | 89/36 |

Primary Examiner—Stephen C. Bentley
Attorney—Spencer & Kaye

[57] ABSTRACT

An armored vehicle having a forward personnel compartment which is lined with radiological shielding and an aft engine compartment, the latter having a lesser height than the former so that the personnel compartment has an upper aft wall portion whose height is equal to the difference between the personnel and engine compartments. This upper aft wall portion is provided with one or more doors through which personnel can leave the vehicle, while being protected, to the front, by the vehicle itself. Additional shielding is provided to protect the personnel, while on the top of the engine compartment, from the side.

6 Claims, 3 Drawing Figures

INVENTOR
Hans-Georg Schallehn

BY *Spencer & Kaye*
ATTORNEYS

ARMORED VEHICLE

BACKGROUND OF THE INVENTION

The present invention relates to an armored vehicle such as a tank, weapons carrier or personnel carrier by means of which troops can be transported to the combat area while being protected against enemy fire and against nuclear radiation, which vehicle allows the occupants to leave the vehicle from the rear in such a way that the vehicle itself provides a cover for the troops while they dismount.

Three conventional models of armored vehicles and particular personnel carriers of the above type, which, however, do not provide protection against nuclear radiation, have the following characteristics:

a. The personnel compartment is forward, the engine compartment is aft and to the side, and the occupants can leave the vehicle by way of a narrow passage which is at one side and is located between the side wall of the vehicle and the engine compartment.

b. The personnel compartment is aft, the engine compartment is in the center of the vehicle and is connected, by means of a cardanic shaft, to the transmission which is located forward. A narrow passage, running between one side wall of the vehicle and the engine compartment, connects the personnel compartment with the driver and another narrow passage, running between the other side wall of the vehicle and the engine compartment connects the personnel compartment with the vehicle commander. The personnel leaves the vehicle from the rear.

c. The personnel compartment is aft, the engine compartment is forward and to the side, the driver and vehicle commander are next to the engine compartment. The driver and commander are connected with the other personnel through a narrow passage running along the side of the vehicle, between the side wall and the engine compartment. The occupants leave the vehicle through the rear.

The vehicles described in (b) and (c) have the advantage over that described in (a) in that they can be provided with a rear door which is sufficiently wide to allow two men to leave simultaneously. This not only allows the squad or platoon to dismount more quickly, but also, the men will be closer together after having dismounted.

The only way in which to provide effective protection against radiological exposure is to make the walls of the vehicle very thick, which means that the vehicle will be very heavy. This, in turn, presents various difficulties in equipping any of the vehicles described in (a), (b) and (c) with effective radiological protection, for the following reasons. In the case of the vehicle described in (a), while the personnel compartment has a configuration which would readily allow the installation of walls which offer good radiological protection, a thick door would have to be provided which opens in the direction of the exit passage and which would have to be secured to the wall of the vehicle or to the wall of the engine compartment. Such a door would, however, make the already narrow passage even narrower to the point where the passage would no longer be able to allow personnel to pass readily through it. If, instead, the door were secured to the wall of the vehicle and were to open in the direction of the personnel compartment the available space through the door would likewise be reduced. If, finally, the door were hinged to the wall of the engine compartment and open in the direction of the personnel compartment, the above drawbacks would not apply once the door was swung through an arc of 180°, but, on the other hand, the space through which the door would swing would be lost from the personnel compartment, at least during the dismounting.

In the vehicles described in (b) and (c), the fact that the interior is divided into many individual compartments means that a large amount of wall area would have to be lined with radiological insulation, and this would increase the weight of the vehicle to the point of impracticality.

It is, therefore, the primary object of the present invention to provide an armored vehicle which is able to provide radiological protection for its occupants but which overcomes the above described drawbacks of conventional armored vehicles.

SUMMARY OF THE INVENTION

According to the present invention, the above objects are achieved by providing an armored vehicle which is so constructed as to allow the occupants to leave the personnel compartment and to reach a protected area constituted by the flat upper surface of a rearwardly located engine compartment.

More particularly, the present invention resides in an armored vehicle having generally block-shaped means forming a personnel compartment and constituting the forward part of the vehicle, this personnel compartment being lined with radiological shielding. The aft part of the vehicle, which is contiguous with the forward part, is constituted by means forming an engine compartment, with the height of the engine compartment being less than the personnel compartment so that the latter has an upper aft wall portion whose height is equal to the difference between the heights of the two compartments. This upper aft wall portion has door means arranged in it, through which the personnel can enter and leave the personnel compartment of the vehicle.

DESCRIPTION OF THE PREFERRED EMBODIMENTS

Figure 1:
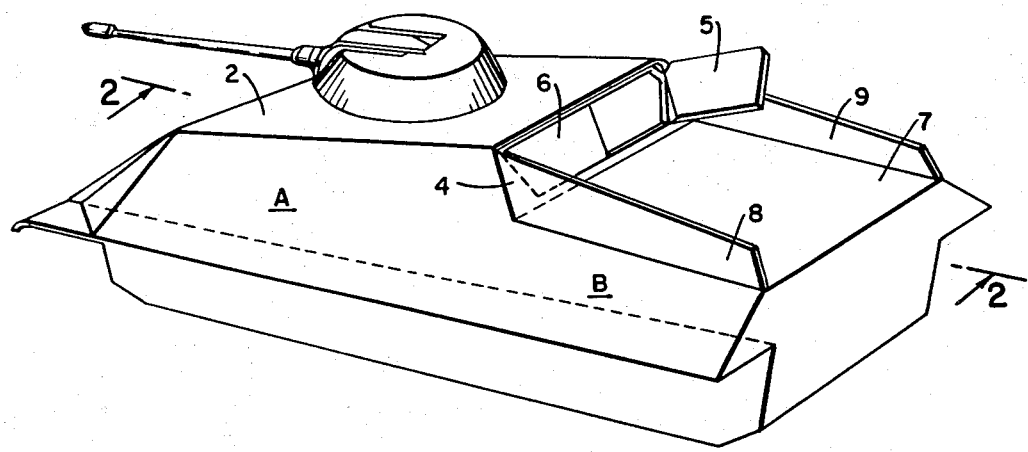
FIG. 1 is a perspective view of an armored vehicle according to the present invention.
Figure 2:
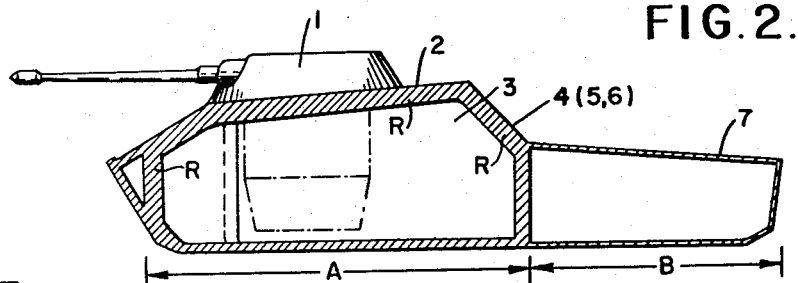
FIG. 2 is a sectional view taken generally on line 2—2 of FIG. 1.

Referring now to the drawings, the same show an armored vehicle in the form of an armed personnel carrier, the invention being, however, generally applicable to other armored vehicles such as tanks, weapons carriers and unarmed personnel carriers. The forward part of the vehicle is generally block-shaped as shown at A and, in the illustrated embodiment, carries a gun turret 1 which projects above the top 2 of part A. The interior 3 of part A serves as the personnel compartment and is lined with radiological shielding R, as, for example, lead, which protects the occupants of the compartment against radiation.

Contiguous with the forward part A is the rear part B whose interior serves as the engine compartment. The height of the engine compartment B is less than the height of the part A, in consequence of which the latter has an upper aft wall portion 4 whose height is equal to the difference between the heights of the parts A and B. It is this upper aft wall portion 4 which has one or more openings in it, the same being closed off by doors 5 and 6 which are likewise lined with radiological shielding and which close off the opening or openings in the wall portion 4. The doors thus serve as the means of ingress and egress for personnel into and out of the personnel compartment 3.

As is apparent from the drawings, the wall portion 4, and hence the plane of the opening or openings of the doors, is steeply inclined, from bottom to top, in forward direction, the angle being about 45°.

The doors 5 and 6 are wider at the top than at the bottom and are so mounted as to swing outwardly such that when they are in open position, they extend generally in the direction of travel of the vehicle and form lateral protective walls which shield personnel coming out of the personnel compartment and onto the top wall 7 of part B, this wall 7 sloping downwardly from the juncture of the forward and aft parts A and B to the rear of the vehicle.

Figure 3:
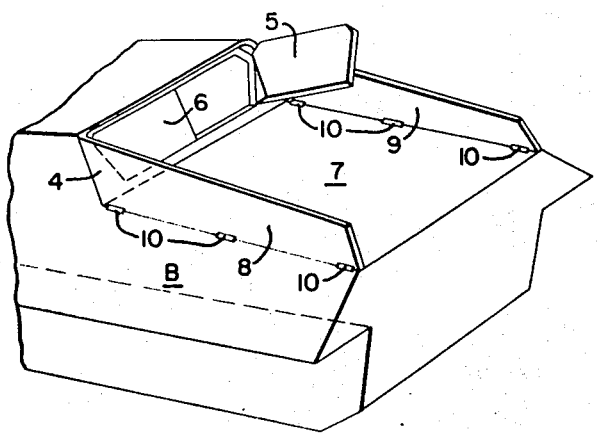
FIG. 3 is a fragmentary perspective view similar to that shown in FIG. 1 but illustrating a modified embodiment of the present invention.

The vehicle is also shown as being equipped with upright shielding means 8 and 9 which are arranged on each side of the vehicle and which extend upwardly from the top wall 7 of the part B, thereby to provide protection for personnel who have come through the door onto the top wall 7. The shielding means, which may be constituted by appropriate armor plating, may either be fixed as shown in FIG. 1, or, as shown in FIG. 3, they may be hinged or otherwise movably mounted — such as by means of hinges 10 — so as to be movable from the vertical position shown in FIG. 3 to a retracted or folded-in position.

Thanks to the above arrangement, there is provided an armored vehicle whose occupants are well protected both against conventional enemy action as well as against radiological weapons. Thanks to the fact that the forward part is a compact, unitary personnel compartment, the ratio of volumetric space to wall surface, and hence to weight of the necessary radiological shielding, is high.

Moreover, thanks to the fact that the upper aft wall portion 4 is inclined, the height of the opening through which the occupants must move in order to leave the vehicle is greater than if the wall portion 4 were vertical. Also, the forward sloping of the wall portion 4 allows the occupants to stand upright before actually climbing through the door, so that it will be easier for the occupants to dismount from the vehicle.

It will also be seen from the above that the doors, which are hinged at the side and which extend from the upper edge of the engine compartment to the upper edge of the personnel compartment, form excellent protective shielding for the personnel after they have left the personnel compartment and climbed onto the top wall 7 of the engine compartment. If desired, suitable locking pins or the like may be provided for holding the doors 5 and 6 in their open position. At the same time, the personnel is protected from the front by the top wall 2 of the part A which slopes upwardly from the leading edge of the vehicle, as well as by the turret 1.

Moreover, the width of the doors 5, 6, which may extend throughout any desired portion of the width of the vehicle, allows two occupants to leave the personnel compartment at the same time.

As stated above, the doors are wider at the top than at the bottom. Consequently, the opening which establishes the communication between the interior and the exterior of part A is wider at shoulder height than further on down. This, too, facilitates ingress and egress.

It will be understood that the above description of the present invention is susceptible to various modifications, changes, and adaptations, and the same are intended to be comprehended within the meaning and range of equivalents of the appended claims.

I claim:

1. In an armored vehicle, the combination which comprises:
   a. generally block-shaped means forming a personnel compartment and constituting the forward part of the vehicle, said personnel compartment being lined with radiological shielding;
   b. means forming an engine compartment and constituting the aft part of the vehicle, said forward and aft parts being contiguous with each other, the height of said engine compartment means being less than the height of said personnel compartment means in consequence of which the latter has an upper aft wall portion whose height is equal to the difference between the heights of said two compartment means; and
   c. door means arranged in said upper aft wall portion of said personnel compartment means and serving as the means of ingress and egress for personnel into and out of said personnel compartment;
   d. said upper aft wall portion, and hence the plane of the opening of said door means, being steeply inclined, from bottom to top, in forward direction, and said door means being wider at the top than at the bottom and comprising at least one door swinging outwardly and, in open position, extending generally in the direction of travel of the vehicle and forming a protective wall.

2. The combination defined in claim 1 wherein said door means comprise two doors each of which swings outwardly and, in open position, extends generally in the direction of travel of the vehicle and forms one of two respective protective walls.

3. The combination defined in claim 1 wherein said means forming said engine compartment include a top wall which slopes downwardly from the juncture of said forward and aft parts of the vehicle to the rear of the vehicle.

4. The combination defined in claim 1, further comprising shielding means arranged on each side of the vehicle and extending upwardly from the top of said means forming said engine compartment, thereby to provide protection for personnel who have come through said door means onto the top of said engine compartment.

5. The combination defined in claim 4 wherein said shielding means are fixed in upright position.

6. The combination defined in claim 4 wherein said shielding means are movable between the upright position and a retracted position.

* * * * *